Oct. 9, 1934.  J. A. HARDING  1,975,940
SAFETY PULLEY
Original Filed June 17, 1932   2 Sheets-Sheet 1

INVENTOR:
JOHN A. HARDING,
By
*Fad W Lewis*
ATTORNEY.

Oct. 9, 1934.  J. A. HARDING  1,975,940
SAFETY PULLEY
Original Filed June 17, 1932  2 Sheets-Sheet 2
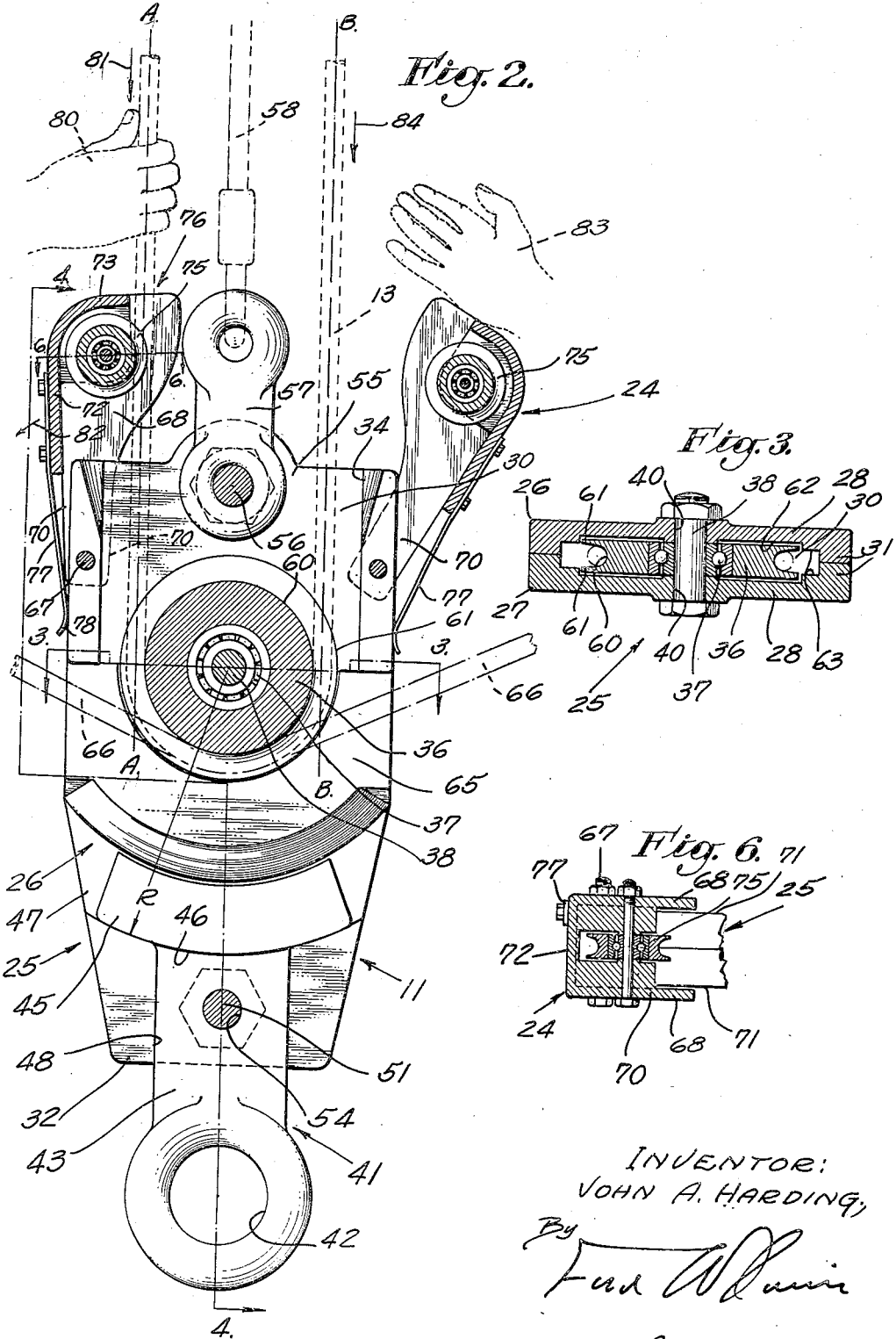
INVENTOR:
JOHN A. HARDING,
By
Fred W. Davis
ATTORNEY.

Patented Oct. 9, 1934

1,975,940

UNITED STATES PATENT OFFICE 1,975,940

SAFETY PULLEY

John A. Harding, Taft, Calif.

Application June 17, 1932, Serial No. 617,834
Renewed April 9, 1934

23 Claims. (Cl. 254—197)

My invention relates to an improvement in pulley devices and relates particularly to a pulley device having safety features for preventing personal injury, catching of the cable member such as a steel cable or fiber rope within the pulley device, and cutting of the cable member.

Pulley devices of the general class to which my invention relates include a body structure supporting a wheel or sheave member over which the cable member is run, and such devices are known by various terms, such as pulleys, blocks, and traveling blocks. There are many instances of record where the hand, and sometimes the clothing, of a workman has been carried by a moving cable member into the pulley device with resultant more or less serious injury.

It is an object of my present invention to provide a pulley device having means for preventing the cable member from carrying into the pulley device the hand or clothing of a workman. The invention is of especial utility in derricks employed in the drilling of wells but may be used in conjunction with any pulley device regardless of whether it is of stationary or traveling character, and regardless of the number of wheels or sheaves employed therein. In oil well derricks a traveling block is employed for raising and lowering pipes and tools, and at the upper portion of the derrick a platform is employed, sometimes known as the tubing board, on which a workman is positioned to connect to and disconnect from the upper ends of pipe members the elevator carried by the traveling block. There are many instances where the hand of a derrick man resting on a cable supporting the traveling block has been carried between the cable and the sheave over which it runs. My invention provides an engagement member supported on a pulley device in such position relative to the path of movement of a cable member toward the pulley device that it will be engaged by any object on the cable member, such as the hand of a workman, and will move laterally in consequence of such engagement so as to carry the engaging object, or workman's hand, away from the cable, preventing entry thereof into the pulley device.

It is a further object of the invention to provide a pulley device having a sheave and a supporting structure for the sheave in the form of a housing having a recess in which the sheave is mounted in an essentially concealed and protected position, and having guide walls which overlap the lips or flanges of the sheave in such a manner that the cable member is positively guided in the groove of the sheave and is prevented from being caught between the sheave and the supporting wall and is likewise prevented from being cut by running off the sheave, thereby preventing accidental severance of the cable member and consequent dropping of the traveling block and the load carried thereby.

A further object of the invention is to provide a simple structure for a pulley device of the above character comprising rugged parts which may be readily assembled and disassembled and which consequently is readily transportable by reason of the fact that the individual parts thereof may be handled by a single workman and transported to the place of use where they may be readily assembled for use.

Further objects and advantages of the invention will be made evident in the following part of the specification.

Referring to the drawings, which are for illustrative purposes only,

Fig. 2 is a partly sectioned elevational view of a pulley device embodying my invention. In this view the front plate of the supporting structure is removed so as to show the interior arrangement of parts.

Fig. 3 is a cross-section on a plane represented by the line 3—3 of Fig. 2.

Fig. 6 is a fragmentary cross-section on a plane represented by the line 6—6 of Fig. 2.

Figure 1:
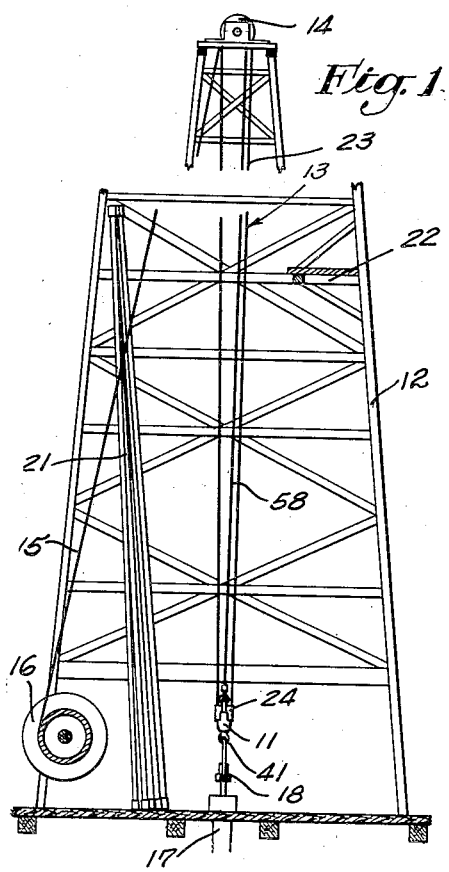
Fig. 1 is a vertically sectioned view showing a derrick employing my invention.

In Fig. 1 I show my pulley device 11 operated in a derrick 12 by a cable member 13 which extends over a crown block 14 and has an end 15 thereof wound on a drum 16. The form of my invention shown is of the single sheave type of the character employed to pull pump tubing 17 from a well by use of an elevator 18. The joints of tubing 21, as they are removed from the well, are stood at one side of the derrick, as shown. For use when manipulating the elevator 18, a platform 22 is mounted in the upper portion of the derrick, on which a workman may stand. Unless constant care is exercised, the hand of a workman engaging the cable strand 23 will be engaged by the pulley device 11 as such device is drawn to the top of the derrick 12. To prevent the hand of the workman from being carried between the cable and the sheave of the device 11, I provide guard means 24 having the characteristics set forth in the above introductory remarks.

Figure 4:
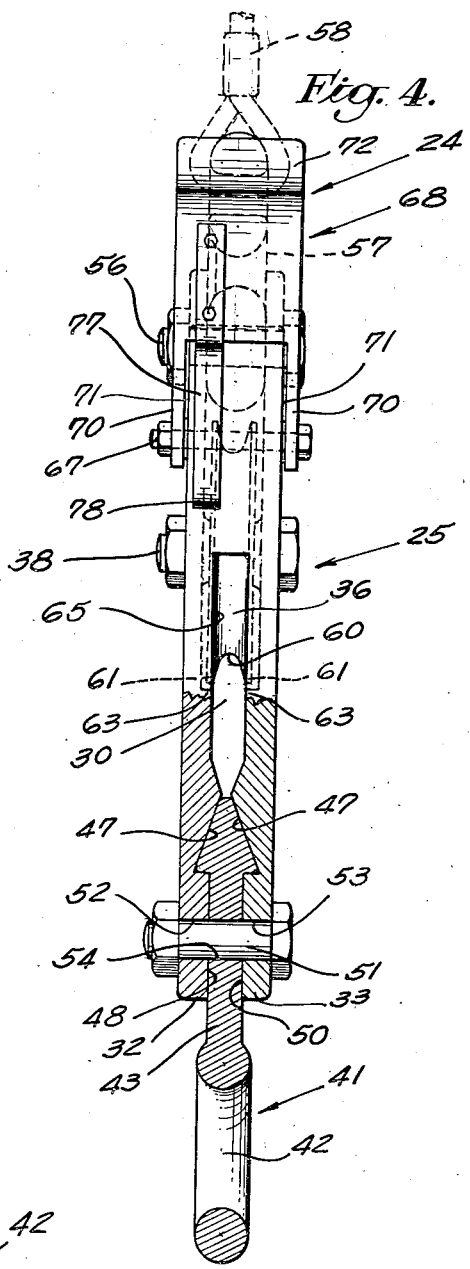
Fig. 4 is a side elevation corresponding to Fig. 2, partly sectioned as indicated by the line 4—4 of Fig. 2.
Figure 5:
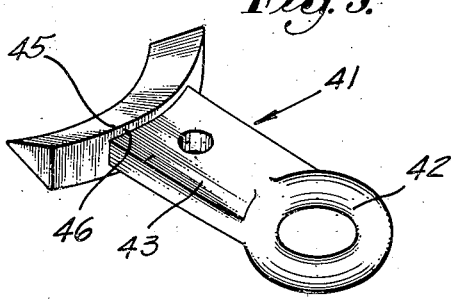
Fig. 5 is a perspective view of the removable eye or attachment member employed in the present form of the invention.

As shown in Figs. 2 to 4, the pulley device 11 comprises a supporting structure 25 consisting of cooperating members 26 and 27 which are of similar form although not exact duplicates. Each of the members 26 and 27 has a side wall 28 of vertically elongated form, which walls are held in spaced relation, so as to form an interior recess or chamber 30, by edge walls or flanges 31 at the upper ends of the walls 28 and by walls or bodies 32 and 33 at the lower ends of the walls 28. The upper end 34 of the recess 30 is open so that the cable member 13 may be carried into the supporting structure 25 to pass over a wheel member or sheave 36 supported by roller bearing means 37 on a lateral pin 38 which extends through openings 40 in the walls 28. For securing the supporting structure 25 to another device, such as the elevator 18, I provide a detachable attachment member 41 preferably having a metal eye 42 at its lower end, a stem 43 of flat bar form, and an arcuate cross bar or head 45 at the upper extremity of the stem 43. The arcuate cross bar 45 is curved on a radius R about the center of the pin 38 and is of triangular cross-section, as shown in Figs. 4 and 5, providing inwardly facing shoulders 46. For receiving the cross bar 45, arcuate channels 47 are formed in the inner faces of the cooperating members 26 and 27, and vertically and centrally along the inner face of the body 32 at the lower end of the member 26 a flat channel 48 is formed to receive the stem 43, the inner face 50 of the body 33 being flat so that it may slide across the face of the stem 43 which is exposed when the stem 43 is in the channel 48. A bolt 51 is extended through openings 52, 53, and 54 in the respective members 26, 27, and 43 for holding the lower end of the assembly together. Through the upper ends 55 of the walls 28 a bolt 56 is extended for holding a clevis 57 adapted to be secured to the end 58 of the cable 13. Where three cable strands are carried to the pulley device, the attachment member 41 may be removed from the assembly without separating the members 26 and 27, by removing the bolts 51 and 56 and swinging the members 26 and 27 on the pin 38 so that the lower end of the member 26 will be offset a sufficient distance to permit the cross bar 45 and the stem 43 to be lifted from their respective channels 47 and 48.

As shown in Figs. 2, 3, and 4, the sheave 36 has a groove 60 formed between lips or flanges 61. Concentric with the pin 38 circular depressions 62 are formed in the inner faces of the walls 28 to receive the ends of the sheave 36 and so that walls 63 are formed which overlap the peripheries of the lips 61 and are adapted to limit the side movement of the cable member 13 as it moves into the pulley device and around the sheave, thereby preventing the cable member from wedging between the sheave and the walls 28 and likewise preventing the cable member 13 from being cut due to running off the sheave 36. The supporting structure also provides side openings 65 through which a cable member may be extended over the sheave in the manner shown by dotted lines 66.

The guard means 24 comprise pivots in the form of bolts or pins 67 disposed along the paths of movement of the cable indicated by the lines A—A and B—B so as to movably support swingable members 68, each of which includes arms or plates 70 adapted to extend upwardly along the outer faces 71 of the supporting structure 25 and beyond the ends 55 of the walls 28. The outer portions of the plates 70 are connected by a wall 72 and an end wall 73 which forms an engagement portion disposed along the path of movement of the cable member 13. Between the outer portions of the plates 70 a roller 75 is mounted in each guard means 24 in position to engage the cable 13 when the guard means is held in extended position, as indicated at 76 in Fig. 2, by means of a spring 77 secured to the wall 72 and having a downwardly projecting end 78 which bears against a wall 31 of the supporting structure 25.

In Fig. 2 I show a hand 80 engaging the cable member 13. Assuming that the cable is moving into the pulley device 11 as indicated by the arrow 81, it will be perceived that the engagement portion 73 of the guard means is in the downward path of movement of the hand 80 moving with such cable. Downward pressure of the hand against the upper end of the guard member causes such member to swing outwardly, as indicated by the arrow 82, so as to carry the hand 80 away from the cable so that the fingers will be opened and carried away from the cable and will not be carried into the pulley device and consequently injured. On the right side of the pulley device shown in Fig. 2 the rightward guard means 24 is shown in an outwardly swung position, and in dotted lines 83 a hand is indicated in a position through which it is carried outwardly by the action of the guard means in swinging outwardly in response to downward pressure of the hand thereon when such hand is carried into engagement therewith by movement of the cable member 13 in the direction of the arrow 84.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A safety pulley device of the character described, including: a body structure having means forming a guide for a cable member moving into said structure; a guard member having a portion adapted to be engaged by a hand moving with said cable member; and means securing said guard member in a position in which said portion lies along the path through which said cable member moves toward said structure, and movable in a lateral direction in response to pressure of said hand thereagainst to carry said hand laterally away from said cable member.

2. A safety pulley device of the character described, including: a body structure having means forming a guide for a cable member moving into said structure; a guard member having a portion adapted to be engaged by a hand moving with said cable member; and means yieldably securing said guard member in a position in which said portion lies along the path through which said cable member moves toward said structure, and movable in a lateral direction in response to pressure of said hand thereagainst to carry said hand away from said cable member.

3. A safety pulley device of the character described, including: a body structure having means forming a guide for a cable member moving into said structure; a guard member having a roller member and a portion adapted to be engaged by a hand moving with said cable member; and means yieldably securing said guard member in a position in which said roller member engages said cable member adjacent said structure and said portion lies along the path through which said cable member moves toward said structure, and movable in a lateral direction in response to pressure of said hand thereagainst to carry said hand away from said cable member.

4. A safety pulley device of the character described, including: a body structure having means forming a guide for a cable member moving into said structure; and a guard member pivoted to said structure and extending along a side of said cable member, said guard member having an end portion adapted to be engaged by a hand on said cable member moving toward said structure and to swing such hand laterally away from said cable member.

5. A safety pulley device of the character described, including: a body structure having means forming a guide for a cable member moving into said structure; a guard member pivoted to said structure and extending along a side of said cable member, said guard member having an end portion adapted to be engaged by a hand on said cable member moving toward said structure and to swing such hand away from said cable member; and yieldable means normally holding said guard member in its position extending along said cable member.

6. A safety pulley device of the character described, including: a body structure having means forming a guide for a cable member moving into said structure; and a guard member pivoted to said structure and extending along a side of said cable member, said guard member having an end portion adapted to be engaged by a hand on said cable member moving toward said structure and to swing such hand away from said cable member, there being a roller within said cable member, there being a roller within the end portion of said guard member for engaging said cable member.

7. A safety pulley device of the character described, including: a body structure having means forming a guide for a cable member moving into said structure; a guard member pivoted to said structure and extending along a side of said cable structure and extending along a side of said cable member, said guard member having an end portion adapted to be engaged by a hand on said cable member moving toward said structure and to swing such hand away from said cable member, there being a roller within the end portion of said guard member for engaging said cable member; and yieldable means normally holding said guard member disposed with said roller in engagement with said cable member.

8. A safety pulley device of the character described, including: a body structure forming a recess; a wheel rotatably mounted in said recess, there being an opening in said structure lying in a path through which a cable member may pass to said wheel; a pivot carried by said body structure in proximity to said path; arm means normally extending from said pivot and outwardly relative to said path and swingable on said pivot in a direction away from said path; engagement means at the outer end of said arm means in a position adjacent said path and in position to be engaged by an object on said cable member; and means for yieldably holding said arm means extending outwardly.

9. A safety pulley device of the character described, including: a body structure having side walls and forming a recess; a wheel rotatably mounted in said recess, there being an opening in said structure lying in a path through which a cable member may pass to said wheel; pivot means carried by said body structure in proximity to said path; arm members extending in substantially parallel relationship from said pivot means and outwardly relative to said path; a wall connecting the outer ends of said arm members, said wall being normally in a position adjacent said path and being adapted to be swung laterally away from said path in response to pressure exerted by an object on said cable member; and means for yieldably holding said arm members extending outwardly.

10. A safety pulley device of the character described, including: a body structure having side walls and a recess open at one end; a wheel rotatably mounted within said recess in position to receive a cable member which follows a path of movement extending through the open end of said recess; pivot means carried by said body structure in proximity to said path; arm members extending in substantially parallel relationship from said pivot means and outwardly relative to said path; a wall connecting the outer ends of said arm members, said wall being normally in a position adjacent said path and being adapted to be swung laterally away from said path in response to pressure exerted by an object on said cable member; and means for yieldably holding said arm members extending outwardly.

11. A safety pulley device of the character described, including: a body structure having side walls and forming a recess; a wheel rotatably mounted in said recess, there being an opening in said structure lying in a path through which a cable member may pass to said wheel; pivot means carried by said body structure in proximity to said path; arm members extending in substantially parallel relationship from said pivot means and outwardly relative to said path; a wall connecting the outer ends of said arm members, said wall being normally in a position adjacent said path and being adapted to be swung laterally away from said path in response to pressure exerted by an object on said cable member; means for yieldably holding said arm members extending outwardly; and a roller mounted near the outer ends of said arm members but within said wall, in position to engage said cable member.

12. A safety pulley device of the character described, including: a body structure having side walls and a recess open at one end; a wheel rotatably mounted within said recess in position to receive a cable member which follows a path of movement extending through the open end of said recess; pivot means carried by said body structure in proximity to said path; arm members extending in substantially parallel relationship from said pivot means and outwardly relative to said path; a wall connecting the outer ends of said arm members, said wall being normally in a position adjacent said path and being adapted to be swung laterally away from said path in response to pressure exerted by an object on said cable member; means for yieldably holding said arm members extending outwardly; and a roller mounted near the outer ends of said arm members but within said wall, in position to engage said cable member.

13. A safety device of the character described, for use with a body structure having a recess with a pulley wheel therein to which a cable member moves through a path of movement, including: pivot means carried by said body structure in proximity to said path; arm members extending in substantially parallel relationship from said pivot means and outwardly relative to said path; a wall connecting the outer ends of said arm members, said wall being normally in a position adjacent said path and being adapted to be swung laterally away from said path in response to pressure exerted by an object on said cable member; and means for yieldably holding said arm members extending outwardly.

14. A safety device of the character described, for use with a body structure having a recess with a pulley wheel therein to which a cable member moves through a path of movement, including: pivot means carried by said body structure in proximity to said path; arm members extending in substantially parallel relationship from said pivot means and outwardly relative to said path; a wall connecting the outer ends of said arm members, said wall being normally in a position adjacent said path and being adapted to be swung laterally away from said path in response to pressure exerted by an object on said cable member; means for yieldably holding said arm members extending outwardly; and a roller mounted near the outer ends of said arm members but within said wall, in position to engage said cable member.

15. A safety guard of the character described, for use with a pulley device comprising a body structure having means forming a guide for a cable which moves into said structure, including: a guard member having a portion adapted to be engaged by a hand moving with said cable; and means securing said guard member in a position in which said portion lies along the path through which said cable moves toward said structure, and movable in a lateral direction in response to pressure of said hand thereagainst to carry said hand away from said cable.

16. A pulley device of the character described, including: a body structure comprising a pair of cooperating walls swingable on a pivot member extending through the forward portions thereof, there being wall means formed at the rearward end of one of said walls, said wall means providing forwardly directed shoulders spaced on opposite sides of a rearwardly extending channel; an attachment member having a stem adapted to rest in said channel and a cross bar formation at the forward end of said stem adapted to engage said shoulders of said wall means, said attachment member being removable from said channel when said walls are swung from aligned positions; and a sheave mounted between said walls on said pivot member.

17. A pulley device of the character described, including: a body structure comprising a pair of cooperating wall members swingable on a pivot member extending through the forward portions thereof, there being wall means formed at the rearward end of one of said wall members, said wall means providing forwardly directed shoulders spaced on opposite sides of a rearwardly extending channel; an attachment member having a stem adapted to rest in said channel and a cross bar formation at the forward end of said stem adapted to engage said shoulders of said wall means, said attachment member being removable from said channel when said wall members are swung from aligned position; and a sheave mounted on said pivot member, said sheave having a peripheral groove formed between peripheral lips, there being walls extending inwardly from said wall members so as to overlap the lips of said sheave and hold a cable member in said groove of said sheave.

18. A pulley device of the character described, including: a body structure comprising a pair of cooperating wall members swingable on a pivot member extending through the forward portions thereof, there being wall means formed at the rearward end of one of said wall members, said wall means providing forwardly directed shoulders spaced on opposite sides of a rearwardly extending channel; an attachment member having a stem adapted to rest in said channel and a cross bar formation at the forward end of said stem adapted to engage said shoulders of said wall means, said attachment member being removable from said channel when said wall members are swung from aligned position; and a sheave mounted on said pivot member, said sheave having a peripheral groove formed between peripheral lips, there being circular recesses formed on the inner faces of said wall members to receive said lips of said sheave.

19. A pulley device, including: a body structure adapted for the passage of a cable member therethrough; a guard member having a portion adapted to be engaged by a hand moving with said cable member; and means yieldably retaining said guard member in a position in which said portion lies along the path through which said cable member moves toward said structure, and movable in response to the contact of said hand thereagainst to carry said hand away from said cable member.

20. A pulley device, including: a body structure adapted for the passage of a cable member therethrough; a guard member having a portion adapted to be engaged by a hand moving with said cable member; and means yieldably retaining said guard member in a position in which said portion lies along the path through which said cable member moves toward said structure, and movable in response to the contact of said hand thereagainst to carry said hand away from said cable member without changing the path of said cable member.

21. A pulley device, including: a body structure adapted for the passage of a cable member therethrough; a guard member having a portion adapted to be engaged by a hand moving with said cable member, said guard member being so attached to said body structure as to be swung by the pressure of said hand against said portion to carry said hand laterally away from said cable member without changing the path of said cable member.

22. A safety guard of the character described, for use with a pulley device comprising a body structure having means forming a guide for a cable which moves into said structure, including: a guard member having a portion adapted to be engaged by a hand moving with said cable; and means securing said guard member in a position in which said portion lies along the path through which said cable moves toward said structure, and movable in a lateral direction in response to pressure of said hand thereagainst to carry said hand laterally away from said cable without changing the path of said cable.

23. A pulley device, including: a body structure comprising a pair of cooperating walls swingable on a pivot member extending therethrough, there being wall means formed at one end of said walls and providing arcuate shoulders concentric with said pivot member and a channel extending from said shoulders to the end of said wall means; an attachment member having a stem adapted to rest in said channel and a head adapted to engage said shoulders of said wall means, said attachment member being removable from said body structure when said walls are swung from aligned position; and a sheave mounted between said walls.

JOHN A. HARDING.